(12) United States Patent
Uruma

(10) Patent No.: US 12,075,009 B2
(45) Date of Patent: Aug. 27, 2024

(54) COMMUNICATION DEVICE, METHOD FOR SELECTING DESTINATION, AND STORAGE MEDIUM

(71) Applicant: CANON KABUSHIKI KAISHA, Tokyo (JP)

(72) Inventor: Kazuhiro Uruma, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/343,676

(22) Filed: Jun. 28, 2023

(65) Prior Publication Data

US 2023/0344946 A1  Oct. 26, 2023

Related U.S. Application Data

(63) Continuation of application No. 17/866,289, filed on Jul. 15, 2022, now Pat. No. 11,736,633, which is a continuation of application No. 16/918,636, filed on Jul. 1, 2020, now Pat. No. 11,418,660.

(30) Foreign Application Priority Data

Jul. 5, 2019 (JP) .................................. 2019-126341

(51) Int. Cl.
*H04N 1/00* (2006.01)
*G06F 3/0482* (2013.01)

(52) U.S. Cl.
CPC ....... *H04N 1/00411* (2013.01); *G06F 3/0482* (2013.01); *H04N 1/00395* (2013.01)

(58) Field of Classification Search
None
See application file for complete search history.

(56) References Cited

U.S. PATENT DOCUMENTS

| 2013/0033448 | A1* | 2/2013 | Yano | G06F 3/018 345/173 |
| 2017/0331964 | A1* | 11/2017 | O | H04N 1/00474 |
| 2018/0113601 | A1* | 4/2018 | Chirogene | G06F 3/016 |
| 2021/0218863 | A1* | 7/2021 | Shimizu | G06F 3/0482 |

FOREIGN PATENT DOCUMENTS

| JP | H04281511 A | 10/1992 |
| JP | H06101266 B2 | 12/1994 |
| JP | 2020115295 A | 7/2020 |

* cited by examiner

*Primary Examiner* — Andrew H Lam

(74) *Attorney, Agent, or Firm* — Canon U.S.A., Inc. I.P. Division

(57) ABSTRACT

In a communication device, if a first touch on a touch panel is detected and, subsequently, a second touch is detected within a predetermined period of time from a time of the first touch and if an object displayed on the touch panel at a position at which the second touch is detected is an object used to select a destination, selection of the destination by the touch on the object is not performed. If a first touch on the touch panel is detected and, subsequently, a second touch is detected within a predetermined period of time from a time of the first touch and if an object displayed on the touch panel at a position at which the second touch is detected is not an object used to select a destination, processing to be activated by the touch on the object is performed.

10 Claims, 11 Drawing Sheets

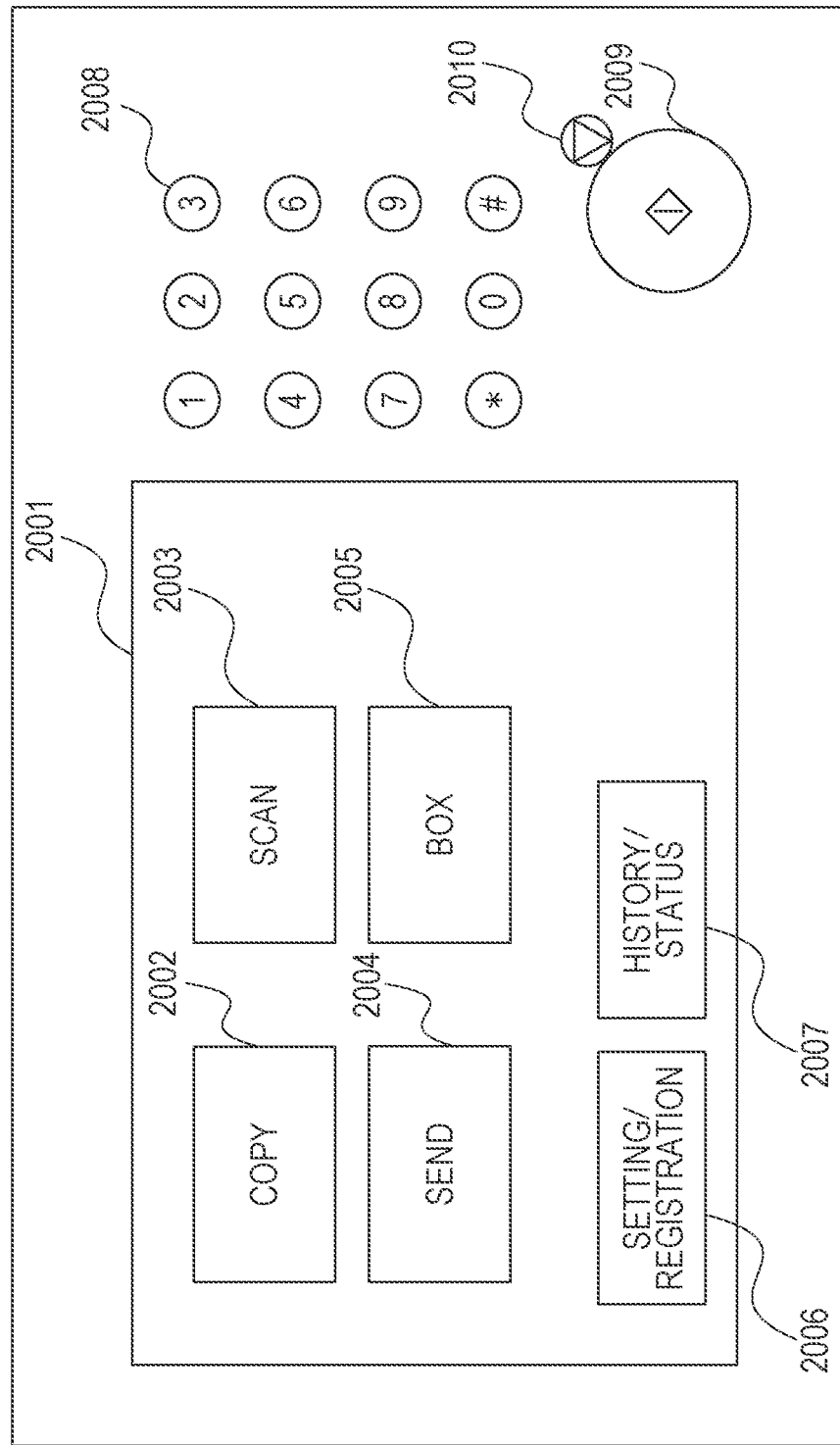

COMMUNICATION DEVICE, METHOD FOR SELECTING DESTINATION, AND STORAGE MEDIUM

CROSS-REFERENCE TO RELATED APPLICATIONS

This application is a Continuation of U.S. application Ser. No. 17/866,289 filed on Jul. 15, 2022, which is a Continuation of U.S. application Ser. No. 16/918,636 filed Jul. 1, 2020, issued as U.S. Pat. No. 11,418,660 on Aug. 16, 2022, which claims the benefit of priority from Japanese Patent Application No. 2019-126341, filed Jul. 5, 2019, each of which is hereby incorporated by reference herein in its entirety.

BACKGROUND

Field

The present disclosure generally relates to communications and, more particularly, to a communication device, a method for selecting a destination, and a storage medium.

Description of the Related Art

A communication device has been developed that is equipped with a touch panel and that is capable of accepting settings, such as the destination of a document image, the resolution of a document to be scanned, and the size of a document to be scanned, via the touch panel.

In the case of sending an email or a fax, a user can operate the touch panel to set the destination to which image data is to be sent, the scanning resolution of the document, and the scanning size of the document. At this time, an image forming apparatus scans the document in accordance with these settings and sends the generated image data to the set destination.

For existing communication devices, a user can register destinations in an address book in advance and select a desired destination from the address book by touching the touch panel. When manipulating an object to display a destination registered in the address book, the user may accidentally touch the touch panel twice. If a destination is displayed in an area the user touched, the destination is selected on the second touch. If the user selects the destination that they originally wanted to select without realizing that the destination has been selected on the second touch, the image data is sent to an unintended destination.

To prevent continuous key input by a user, a technique described below has been developed.

That is, if two key inputs are detected over a short period of time (300 ms), the second key input is disabled (refer to, for example, Japanese Patent Publication No. H06-101266).

To improve the operability of key input, the key input interval, that is, the chattering interval is adjusted in accordance with the level of skill of the user (an operator) (refer to, for example, Japanese Patent Application Laid-Open No. H04-281511).

However, since the existing technique invalidates continuous input in a short period of time for all inputs, not only for an input to select an item, such as a destination, that leads to wrong transmission, the user's operability is degraded when a user accustomed to the operation wants to make a plurality of touches in a short period of time.

SUMMARY

According to an aspect of the present disclosure, a communication device for sending image data to a destination selected using a touch panel is provided. The communication device includes the touch panel and a detection unit to detect a touch on the touch panel. In a case where a first touch is detected by the detection unit and, subsequently, a second touch is detected within a predetermined period of time from a time of the first touch and if an object displayed at a position at which the second touch is detected is an object used to select a destination, selection of the destination by the touch on the object is not performed. In a case where a first touch is detected by the detection unit and, subsequently, a second touch is detected within a predetermined period of time from a time of the first touch and if an object displayed at a position at which the second touch is detected is not an object used to select a destination, processing to be activated by the touch on the object is performed.

Further features of the present disclosure will become apparent from the following description of exemplary embodiments with reference to the attached drawings.

BRIEF DESCRIPTION OF THE DRAWINGS

FIG. 2 is a configuration diagram of an operation unit.

DESCRIPTION OF THE EMBODIMENTS

Various exemplary embodiments, features, and aspects of the present disclosure are described in detail below with reference to the accompanying drawings.

First Embodiment

Figure 1:
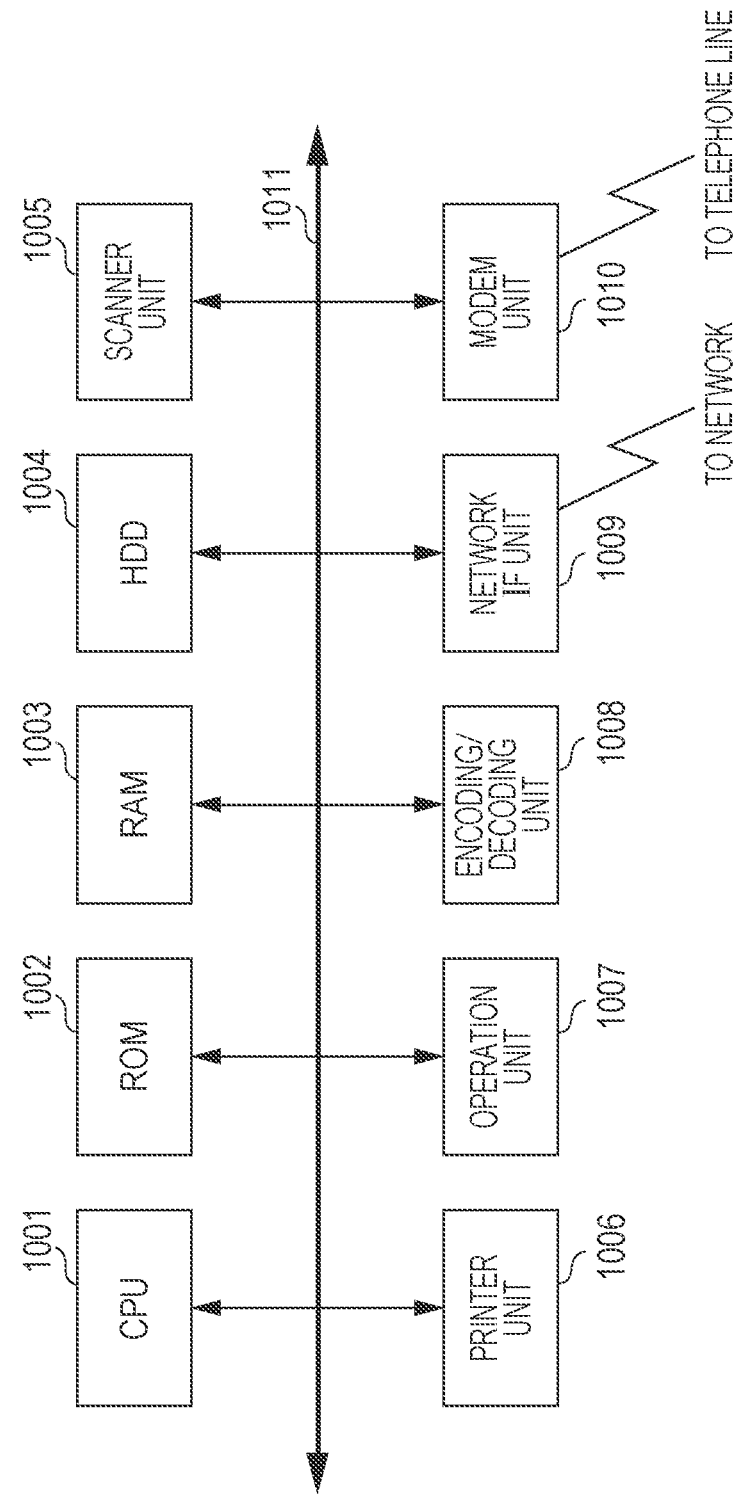
FIG. 1 is a hardware configuration diagram of an image forming apparatus.

FIG. 1 is a hardware configuration diagram schematically illustrating the configuration of an image forming apparatus that is an example of a communication device of the present disclosure.

A central processing unit (CPU) 1001, which may include one or more processors, circuitry, or a combination thereof, performs overall control of the image forming apparatus.

A read only memory (ROM) 1002 is a memory that stores programs to be read out by the CPU 1001.

The random access memory (RAM) 1003 is a read-write memory that functions as a work memory for the CPU 1001.

A hard disk drive (HDD) 1004 is a storage device having a large-capacity storage area. The HDD 1004 stores, for example, a boot program, a variety of application programs, font data, programs for displaying screens, image data, and a file for managing user information regarding each of users. Instead of the HDD 1004, a Secure Digital (SD) card or a flash memory may be used.

A scanner unit 1005 scans a document and generates image data representing the image of the document. The scanner unit 1005 scans a document on the basis of the scan settings (e.g., the document size, copy ratio, scanning resolution, and density) set by a user. In addition, the scanner unit 1005 may have a configuration including an auto document feeder (ADF) (not illustrated) and may scan multiple document sheets fed one by one.

A printer unit 1006 prints an image on each of paper sheets on the basis of the image data. The printer unit 1006 is equipped with a finisher to perform post-processing on the paper sheets each having the image printed thereon.

An operation unit 1007 includes a hard key and a touch panel. The touch panel includes a display (a display unit) and a touch panel sheet that receives touch operations. The touch panel sheet is bonded onto the display.

An encoding/decoding unit 1008 encodes image data to be sent to an external apparatus into compressed data. In addition, the encoding/decoding unit 1008 decodes compressed data received from the external apparatus into image data.

A network interface (IF) unit 1009 controls exchange of data between the image forming apparatus and a network. Examples of the network include a local area network (LAN) and a wide area network (WAN).

A modem unit 1010 controls exchange of data between the image forming apparatus and the public switched telephone network (PSTN) line, which is a telephone line.

FIG. 2 is a diagram illustrating an example configuration of the operation unit 1007 of the image forming apparatus according to the present disclosure.

The operation unit 1007 illustrated in FIG. 2 includes a touch panel 2001 and hard keys 2008 to 2010. The touch panel 2001 is configured by integrating a display with a touch panel sheet (a touch detection unit).

The touch panel 2001 has a copy button 2002, a scan button 2003, a send button 2004, and a box button 2005 displayed therein, which are buttons to select applications. In addition, the touch panel 2001 has a setting/registration button 2006 and a history/status button 2007 displayed therein. The setting/registration button 2006 brings up a variety of setting screens, and the history/status button 2007 brings up a job history screen or a job operation status screen.

In addition, the operation unit 1007 has, as the hard keys, the numeric key 2008 used to input numerical values, the start key 2009 used to start a variety of jobs, such as a copy job and fax transmission, and the stop key 2010 used to stop the variety of jobs.

The operation unit 1007 receives instructions from a user operating the touch panel and the variety of hard keys and transmits the received instructions to the CPU 1001. The CPU 1001 can control the operation unit 1007 to display a variety of objects, such as characters, a symbol, and an image, on the display of the touch panel 2001.

The touch panel 2001 performs processing in accordance with detection of a touch operation. More specifically, when a user touches the touch panel 2001, a tap-in event occurs. The CPU 1001 detects the position at which the user has generated the tap-in event. Thereafter, when the user removes their finger from the touch panel 2001, the CPU 1001 determines that a tap-out event has occurred. When the user triggers the tap-in event and, subsequently, the tap-out event, the CPU 1001 determines that a click event has occurred, that is, a touch operation is detected.

FIGS. 3A to 3D illustrate a send screen displayed on the touch panel of the image forming apparatus according to the present disclosure.

Figure 3A:
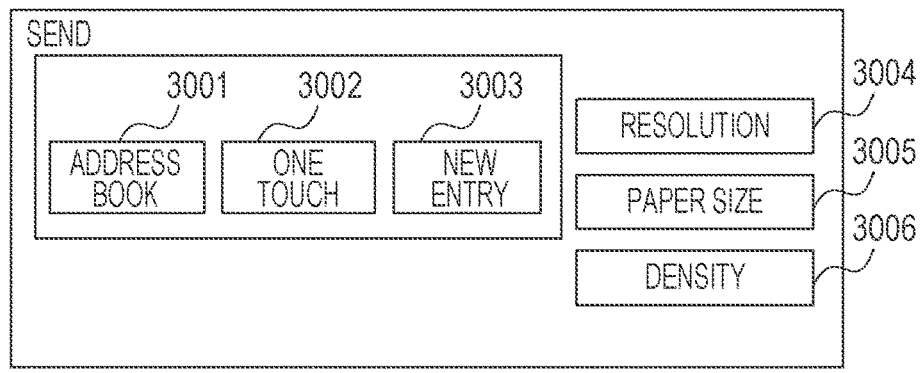
FIG. 3A is a send screen that is displayed when a send button illustrated in FIG. 2 is touched.

FIG. 3A is a send screen that is displayed upon touch of the send button 2004 illustrated in FIG. 2.

The send screen has, displayed therein, an address book button 3001 used to select a destination, a one-touch button 3002, and a new entry button 3003 used to input a new destination. In addition, the send screen has, displayed therein, a resolution button 3004 used to set a scanning resolution for a document to be scanned, a paper size button 3005 used to set the size of the document, and a density button 3006.

Figure 3B:
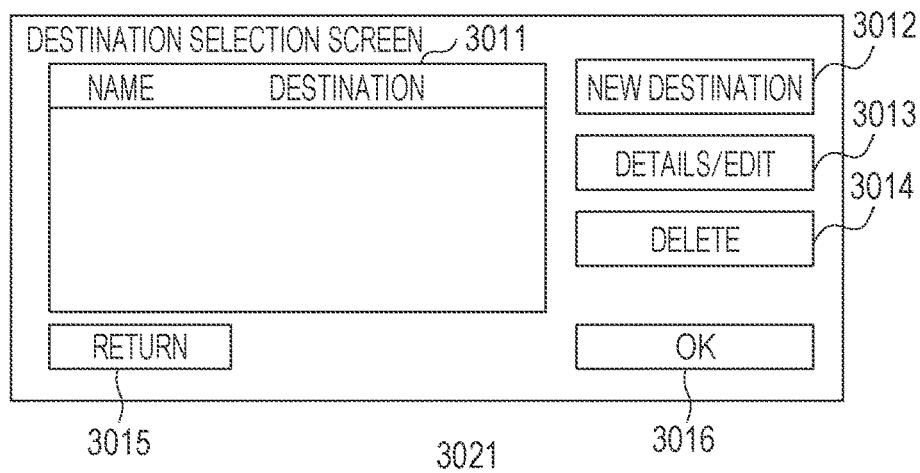
FIG. 3B illustrates a destination selection screen displayed on an operation panel when an address book button in the send screen illustrated in FIG. 3A is touched.

FIG. 3B illustrates a destination selection screen displayed on the operation unit 1007 upon touch of the address book button 3001 in the send screen illustrated in FIG. 3A.

A destination display area 3011 is an area to display a list of pre-registered destinations in the address book. As illustrated in FIG. 3B, the destinations are not displayed in the destination display area 3011 immediately after the transition from the screen illustrated in FIG. 3A.

In addition to the destination display area 3011, the destination selection screen has buttons displayed therein, such as a new destination button 3012, a details/edit button 3013, a delete button 3014, a return button 3015, and an OK button 3016. The new destination button 3012 is a button that is pressed to register a destination. When the new destination button 3012 is pressed, an edit screen is displayed for inputting a destination and the name of the destination that the user wants to register in the address book. The edit screen has a software keyboard displayed therein. When a destination and the name of the destination are input into the edit screen via the software keyboard and, thereafter, an OK key is pressed, a set of the name of the destination and the destination is registered in the address book. The details/edit button 3013 is a button that is pressed to edit a destination and the name of the destination already registered in the address book. The delete button 3014 is a button to delete the destination and the name of the destination already registered in the address book.

Figure 3C:
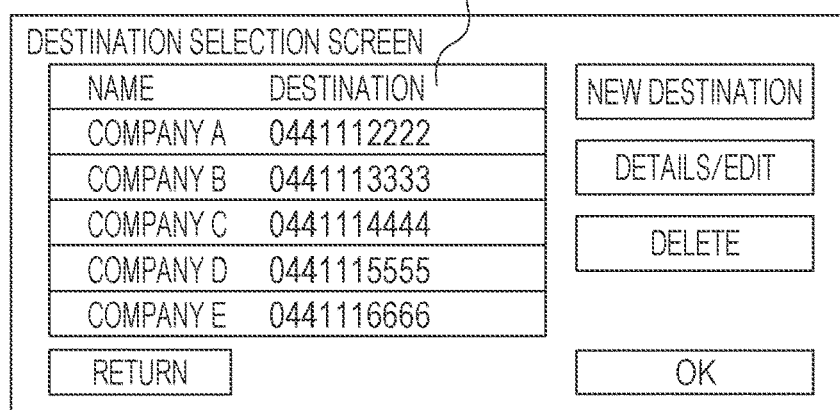
FIG. 3C illustrates a destination selection screen displayed after a predetermined period of time has elapsed from the time the screen illustrated in FIG. 3B was displayed.

The screen illustrated in FIG. 3C is the destination selection screen that is displayed after a certain period of time has elapsed from the time the screen illustrated in FIG. 3B was displayed. The destination list is displayed in a destination display area 3021 of the screen illustrated in FIG. 3C.

Figure 3D:
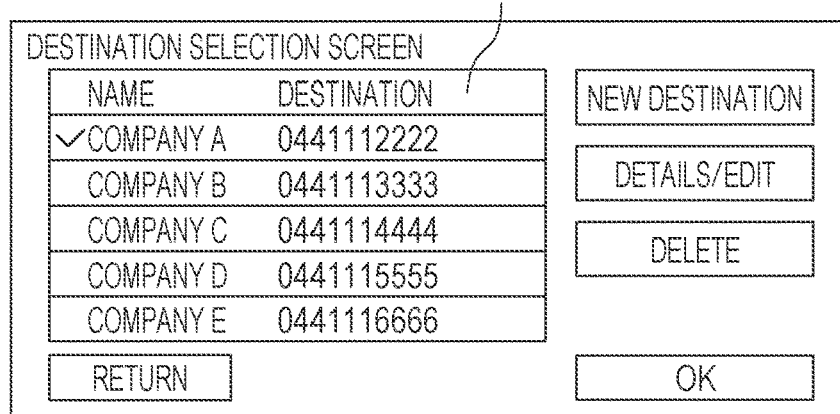
FIG. 3D illustrates a screen displayed after a user selects a destination in the screen illustrated in FIG. 3C.

A screen illustrated in FIG. 3D is a screen displayed when the user selects one of the destinations in FIG. 3C.

In the screen illustrated in FIG. 3D, a check mark indicates that one of the destinations "Company A 0441112222" is selected. When one of the destinations is selected as illustrated in FIG. 3D and, thereafter, the OK key in FIG. 3D is pressed, selection of the destination is determined. Thereafter, when the user presses a start key of the operation unit 1007, the image forming apparatus generates the image data of a document by scanning the document with the scanner 1005 and sends the generated image data to the selected destination. If the destination is an email address or a folder path, the image data is sent via the network IF unit 1009. If the destination is a fax number, the image data is sent via the modem unit 1010.

As described above, when a user selects a destination, the user can select the destination by touching the address book button 3001 in the send screen of the touch panel 2001 and, thereafter, touching the destination listed in the destination selection screen.

Although not illustrated, the user can also select a destination by touching the one-touch button 3002 or inputting a destination by touching the new entry button 3003 in the send screen of the touch panel 2001.

Figure 5A:
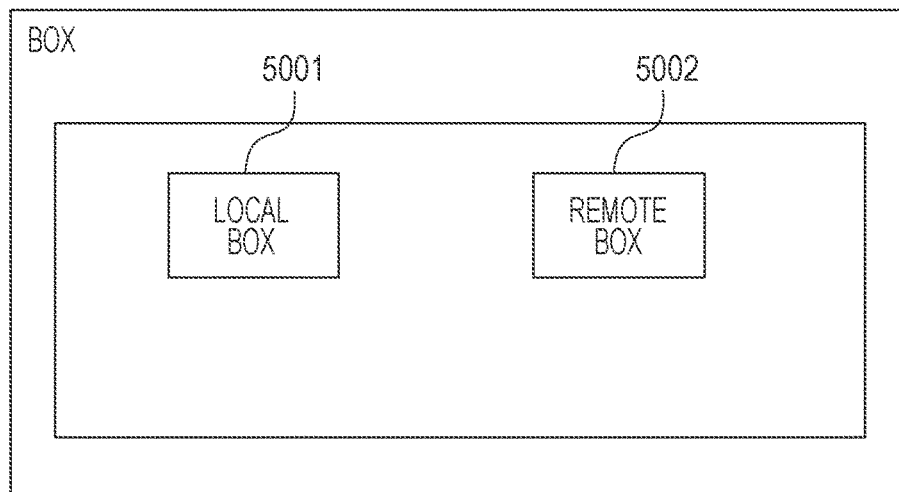
FIG. 5A illustrates a box screen displayed on the operation unit when a user touches a box button in the touch panel of the operation unit.
Figure 5B:
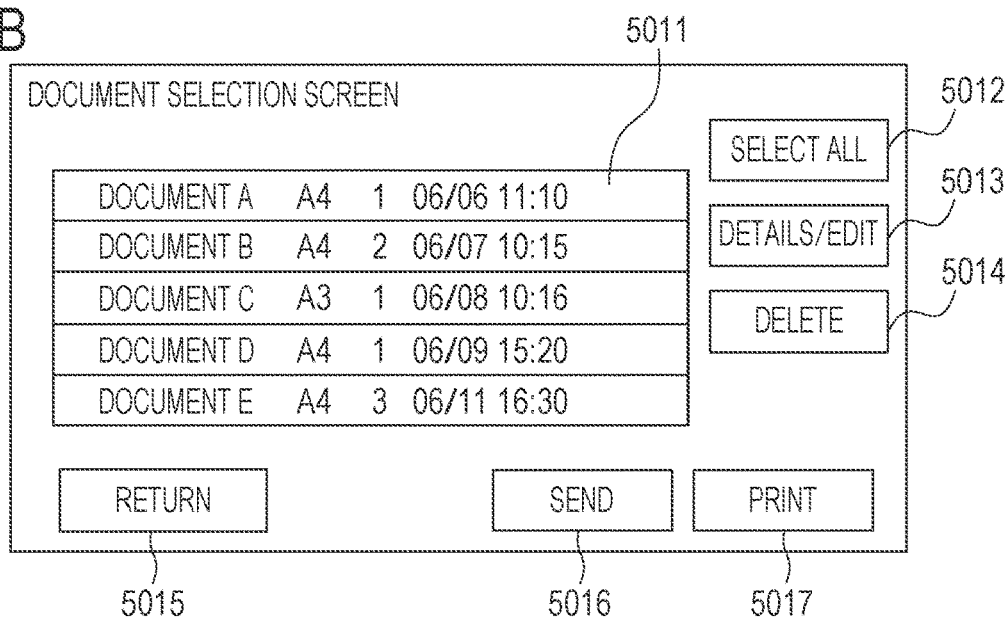
FIG. 5B illustrates a document selection screen displayed when a user touches a local box in the screen illustrated in FIG. 5A.
Figure 5C:
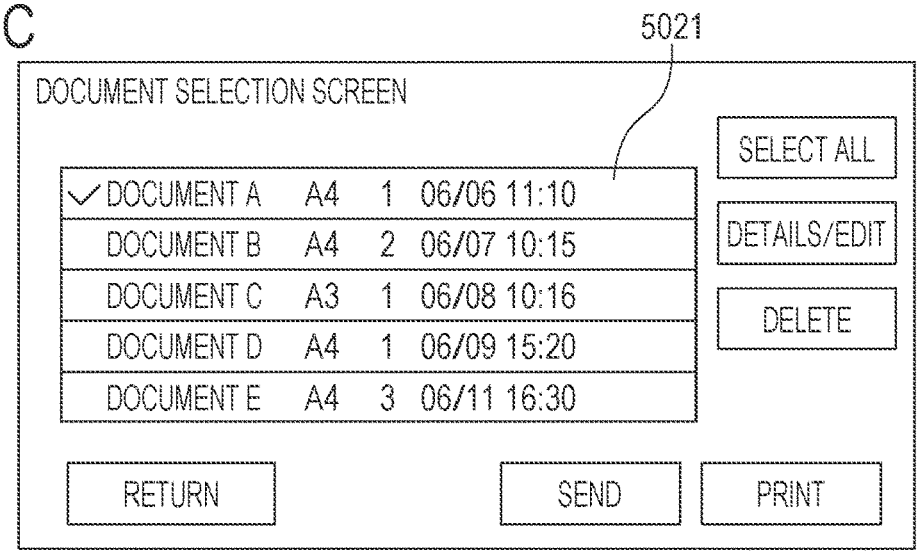
FIG. 5C illustrates a screen displayed when the user selects one of documents in the screen illustrated in FIG. 5B.

FIGS. 5A to 5C are diagrams illustrating a box screen displayed on the touch panel of the image forming apparatus according to the present disclosure.

A screen illustrated in FIG. 5A is a box screen displayed on the operation unit 1007 when the user touches the box button 2005 on the touch panel 2001 of the operation unit 1007.

The box screen has, displayed therein, a local box 5001 used to access a document stored in the image forming apparatus. In addition, the box screen has, displayed therein, a remote box 5002 used to access a document stored in a personal computer located outside the image forming apparatus via a network.

The screen illustrated in FIG. 5B is a document selection screen displayed upon user's touch of the local box 5001 in the screen illustrated in FIG. 5A.

In a document selection area 5011, a list of the documents stored in the apparatus is displayed. In the document selection area 5011, the name of the document, the size of the document, the number of pages of the document, and the date and time when the document was stored in the box are displayed from the left to right. In the example illustrated in FIG. 5B, five documents, that is, document A to document E are stored. Each of the documents are received from an external personal computer (PC) via a network together with an instruction to store the document into the box. If more than six documents are stored, the documents that are not displayed can be displayed by using a scroll function. In the areas other than the document selection area 5011, a select all button 5012 used to select all of the documents, a details/edit button 5013 used to, for example, delete a page of a stored document or rename a stored document, and a delete button 5014 used to delete a document are displayed. In addition, in the areas other than the document selection area 5011, a return button 5015 used to transition to the previous screen (the screen illustrated in FIG. 4A), a send button 5016 used to send the selected document, and a print button 5017 used to print the selected document are displayed.

The screen illustrated in FIG. 5C is a screen displayed when the user selects one of the documents displayed in the screen illustrated in FIG. 5B. In this screen, a check mark indicates that one of the documents, that is, document A, is selected.

To select a document to be sent in this manner, the user can touch the local box 5001 in the box screen on the touch panel 2001 and select the document by touching the document listed in the document selection screen.

Figure 7A:
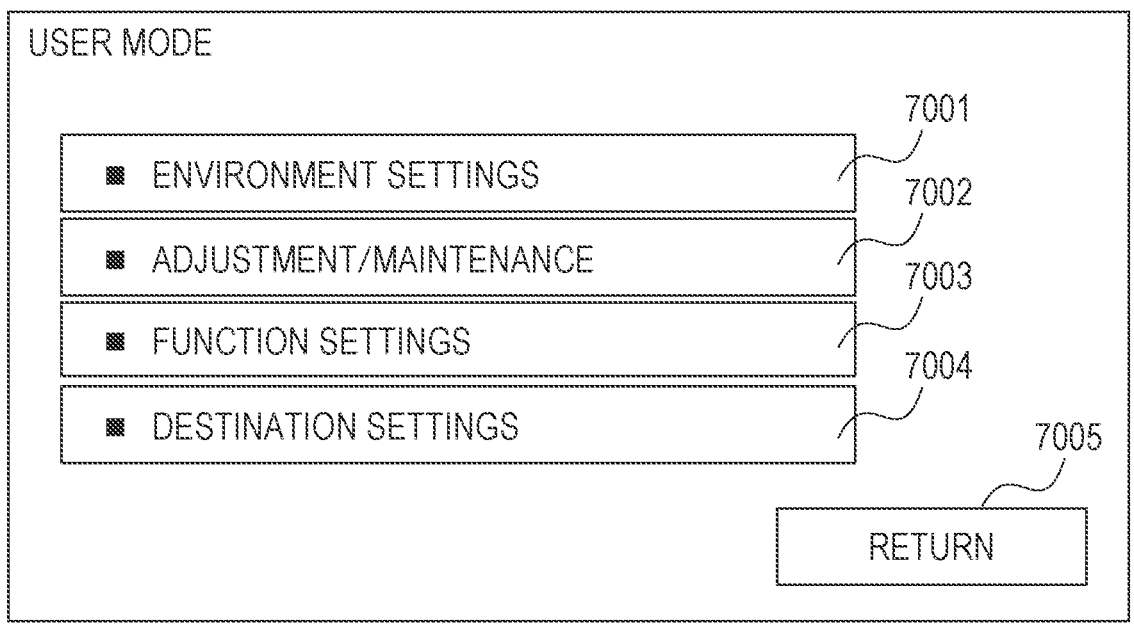
FIG. 7A illustrates a screen that appears when a setting/registration button is touched on the touch panel of the operation unit.
Figure 7B:
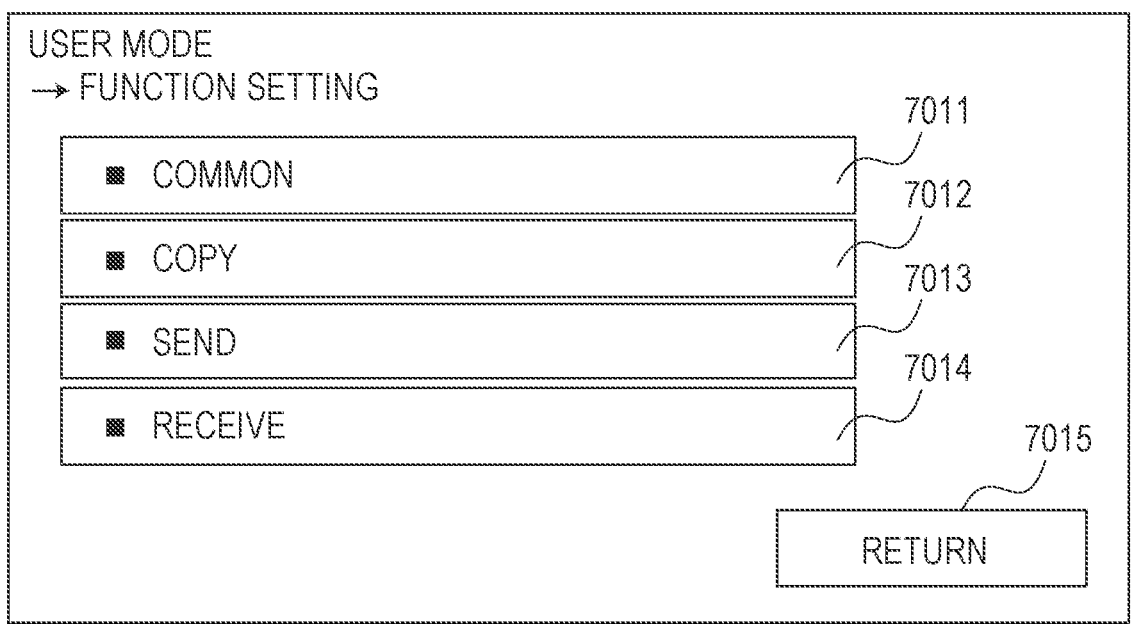
FIG. 7B illustrates a function setting screen displayed when a function setting button is selected in the screen illustrated in FIG. 7A.

FIGS. 7A and 7B illustrate a user mode screen displayed on the touch panel of the image forming apparatus according to the present disclosure.

A variety of settings can be made to the image forming apparatus in advance by performing setting and registration on the user mode screen.

FIG. 7A illustrates a screen that is displayed when the setting/registration button is touched on the touch panel 2001 of the operation unit 1007.

The user mode screen has, displayed therein, an environment setting button 7001 used to change the date and time and the language, an adjustment/maintenance button 7002 used to, for example, adjust the image quality and perform cleaning, and a function setting button 7003 used to access various settings, such as copy settings and send settings. In addition, the user mode screen has, displayed therein, a destination setting button 7004 used to register a destination in the address book and set a one-touch address and a return button 7005.

A screen illustrated in FIG. 7B is a function setting screen displayed when the function setting button 7003 is selected in the screen illustrated in FIG. 7A.

The function setting screen has, displayed therein, a common button 7011 used to configure common function settings, a copy button 7012 used to proceed to a screen for copy function settings, and a send button 7013 used to proceed to a screen for send function settings. In addition, the function setting screen has, displayed therein, a receive button 7014 used to proceed to a screen for reception settings and the return button 7015.

Figure 8:
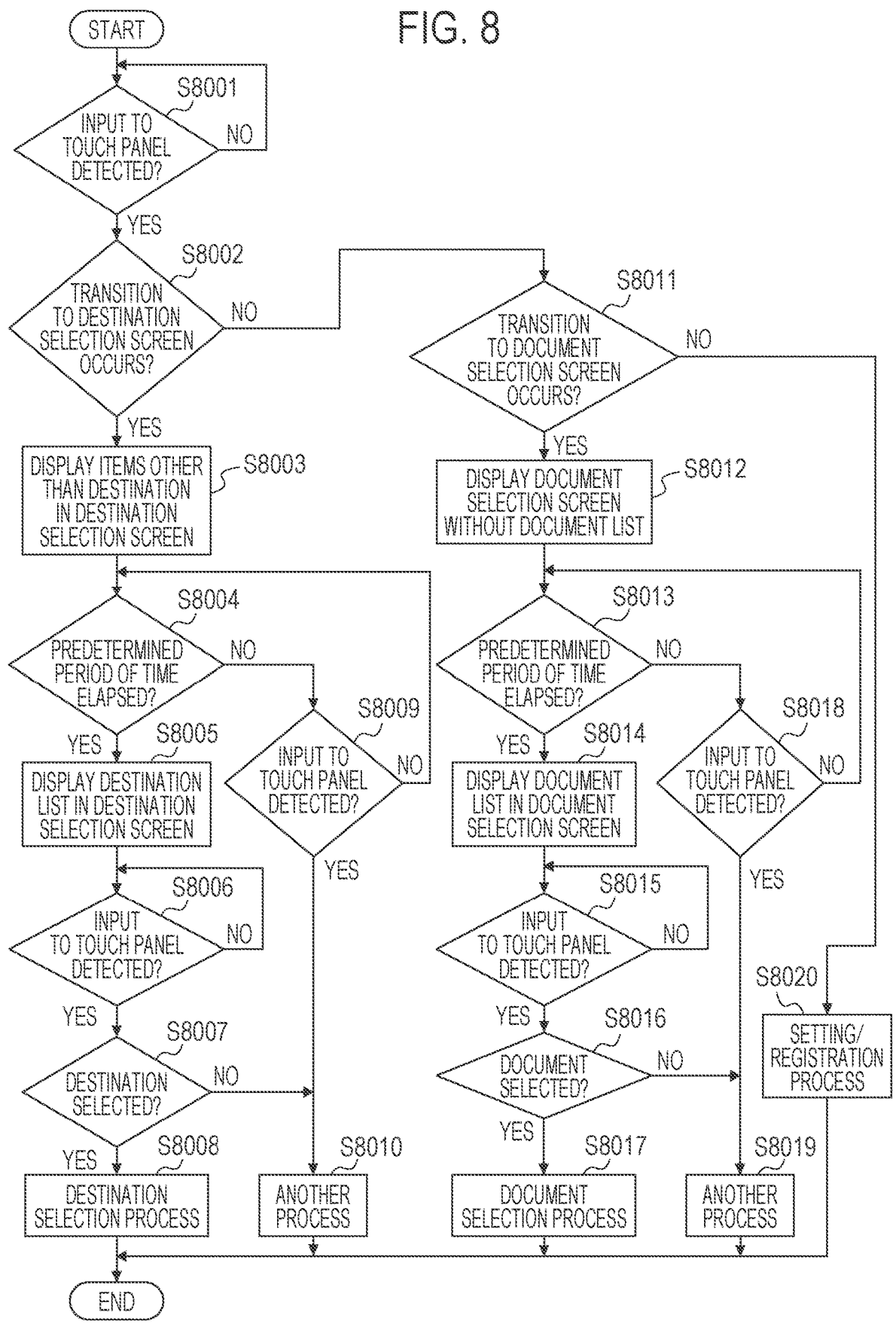
FIG. 8 is a flowchart of a destination selection process.

FIG. 8 illustrates a first flowchart of a destination selection process which allows a user to select a destination while preventing incorrect selection of the destination on the destination selection screen. The process illustrated in the first flowchart is accomplished by the CPU 1001 loading a program stored in the ROM 1002 into the RAM 1003 and executing the loaded program.

When the user performs a touch operation on the touch panel 2001, the CPU 1001 obtains, from the operation unit 1007, the position information that indicates the touch position along with touch detection notification (step S8001).

After obtaining the position information, the CPU 1001 identifies one of the buttons displayed on the touch panel 2001 and corresponding to the position information. Thereafter, the CPU 1001 determines whether the current screen transitions to the destination selection screen (step S8002).

If transition to the destination selection screen occurs, that is, if the address book button 3001 is touched in FIG. 3A, the processing performed by the CPU 1001 proceeds to step S8003. However, if transition to the destination selection screen does not occur, the processing proceeds to step S8011.

Subsequently, the CPU 1001 causes the touch panel 2001 to display the destination selection screen illustrated in FIG.

3B with the destinations hidden (step S8003). At this time, the destination display area 3011 is hidden, and the user cannot detect any destination while the destination display area 3011 is being hidden.

Subsequently, after displaying the destination selection screen illustrated in FIG. 3B, the CPU 1001 determines whether a predetermined period of time has elapsed by referring to the timer (not illustrated) (step S8004).

If it is determined that the predetermined period of time has elapsed (the current time is not within the predetermined period of time after start of the timer), the processing proceeds to step S8005. However, if it is determined that the predetermined period of time has not elapsed, the processing proceeds to step S8009.

Thereafter, the CPU 1001 monitors a touch input from the user onto the touch panel. If a touch is detected, the processing performed by the CPU 1001 proceeds to step S8010. However, if a touch is not detected, the processing returns to step S8004, where the CPU 1001 determines whether the predetermined period of time has elapsed (step S8009).

Subsequently, if a touch is detected in step S8009, the CPU 1001 identifies one of the buttons corresponding to the position information and makes a screen transition (step S8010).

Subsequently, if the predetermined period of time elapses in step S8004, the CPU 1001 displays the destination selection screen with destinations displayed therein (the screen illustrated in FIG. 3C) (step S8005).

In the destination selection screen (the screen illustrated in FIG. 3C), destinations are displayed in the destination display area 3021, and the displayed destinations can be detected.

That is, when the destination selection screen (a screen illustrated in FIG. 3B) is displayed, the destination display area 3011 is hidden and, thus, the destination cannot be selected. However, the buttons other than the destinations, such as the new destination button 3012, the return button 3015, and the OK button 3016, can be selected. If one of these buttons is selected, screen transition can be made in accordance with the selected button. In addition, after a predetermined period of time elapses, the destination selection screen (the screen illustrated in FIG. 3C) is displayed. At this time, the destinations are displayed in the destination display area 3021, and the destinations can also be selected.

Subsequently, the CPU 1001 monitors a touch input from the user onto the touch panel (step S8006).

If the destination is selected through touch detection, the processing proceeds to step S8008. However, if the button other than the destination is selected, the processing proceeds to step S8010 (step S8007).

If, in step S8007, the destination is selected, the CPU 1001 performs the destination selection process (step S8008).

That is, if destination Ain the destination display area 3021 of the destination selection screen (the screen illustrated in FIG. 3C) is selected, a destination selection screen in which the destination selected in the destination selection process has a check mark added thereto (the screen illustrated in FIG. 3D) is displayed. In addition, although no detailed description is given in the present embodiment, if a button other than the destination (for example, the new destination button 3012, the details/edit button 3013, the delete button 3014, the return button 3015, or the OK button 3016) is selected, screen transition is made in accordance with the selected button.

Subsequently, prevention of incorrect document selection is described below with reference to a flowchart.

If, in step S8002, it is determined that the transition is not screen transition to the destination selection screen, the CPU 1001 determines whether the transition is screen transition to the document selection screen (step S8011).

If the transition is screen transition to the document selection screen, the processing proceeds to step S8012. However, if the transition is not screen transition to the document selection screen, the processing proceeds to step S8020.

Subsequently, the CPU 1001 causes the touch panel 2001 to display the document selection screen without a document list displayed therein (step S8012). At this time, the document display area is hidden, and the user cannot detect any document while the document display area is being hidden.

Subsequently, the CPU 1001 determines whether a predetermined period of time has elapsed from the time the document selection screen without a document list displayed therein was displayed (step S8013).

If it is determined that the predetermined period of time has elapsed, the processing proceeds to step S8014. However, if it is determined that the predetermined period of time has not elapsed, the processing proceeds to step S8018.

Thereafter, the CPU 1001 monitors a touch input from the user onto the touch panel. If a touch is detected, the processing proceeds to step S8019. However, if a touch is not detected, the processing returns to step S8013, where the CPU 1001 determines whether the predetermined period of time has elapsed (step S8018).

Subsequently, if, in step S8018, a touch is detected, the CPU 1001 identifies a button corresponding to the position information and makes screen transition (step S8019).

However, if a touch is not detected, the processing returns to step S8013, where the CPU 1001 determines whether the predetermined period of time has elapsed.

Subsequently, if, in step S8013, the predetermined period of time has elapsed, the CPU 1001 displays a document list on the document selection screen (step S8014).

In the document selection screen, a document list is displayed in the document display area, and the displayed documents can be detected.

That is, when the document selection screen without a document list displayed therein is displayed, the document display area is hidden and, thus, a document cannot be selected. However, the buttons other than the document can be selected. When one of the buttons is selected, screen transition is made in accordance with the selected button. In addition, when a predetermined period of time elapses, the document selection screen with a document list is displayed, and the user can select a document as well.

Subsequently, the CPU 1001 monitors a touch input from the user onto the touch panel (step S8015).

At this time, if a document in the list is selected through touch detection, the processing proceeds to step S8017. However, if a button other than a document is selected, the processing proceeds to step S8019 (step S8016).

In addition, if a document is selected through touch detection, the CPU 1001 controls the touch panel 2001 to display a check mark next to the selected document in the document selection process (step S8017).

However, if a button other than a document is selected, the CPU 1001 makes screen transition in accordance with the selected button in the same way as in step S8010 (step S8019).

If the touch detection in step S8001 indicates neither transition to the destination selection screen nor transition to the document selection screen, the CPU 1001 makes screen transition to a screen in accordance with the selected button (step S8020).

For example, if the function setting button 7003 is selected in the user mode screen (a screen illustrated in FIG. 7A), which is a screen different than both the destination selection screen and the document selection screen, transition to the function setting screen (a screen illustrated in FIG. 7B), which is the next screen, immediately occurs.

As described above, the list of destinations and the list of documents are hidden in the destination selection screen and document selection screen, respectively, for a predetermined period of time, and detection of a destination or a document is prohibited while the list is being hidden.

According to the disclosure of the present embodiment, degradation of the user's operability can be prevented while avoiding an unwanted operation caused by incorrect selection. In particular, for example, by prohibiting detection of a destination or a document, a user can avoid incorrect selection of a destination or a document caused by tapping the touch panel twice or more, which is a mis-operation of the touch panel performed by the user.

Although the above embodiment does not mention the value of the predetermined period of time, the predetermined period of time can be set to about 400 ms to ensure the user's operability and prevent unwanted operation caused by tapping the touch panel twice or more. In addition, although not illustrated in the present embodiment, the predetermined period of time may be set or changed by the user.

Second Embodiment

According to the first embodiment, the example of a technique for preventing incorrect selection of a destination has been described, in which the destinations are not displayed until a predetermined period of time elapses, and the destinations are displayed after the predetermined period of time has elapsed.

According to a second embodiment, an example is described in which the control is changed depending on whether the position of a touch to display the destination selection screen is the same as or close to the position of a touch after the destination selection screen is displayed.

Figure 4A:
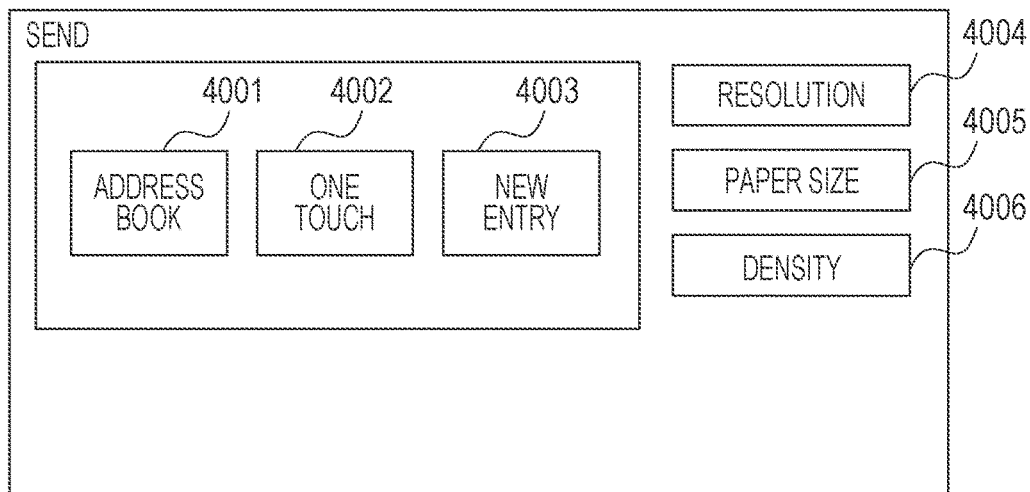
FIG. 4A illustrates a send screen that appears when a send button is touched on the touch panel of the operation unit.
Figure 4B:
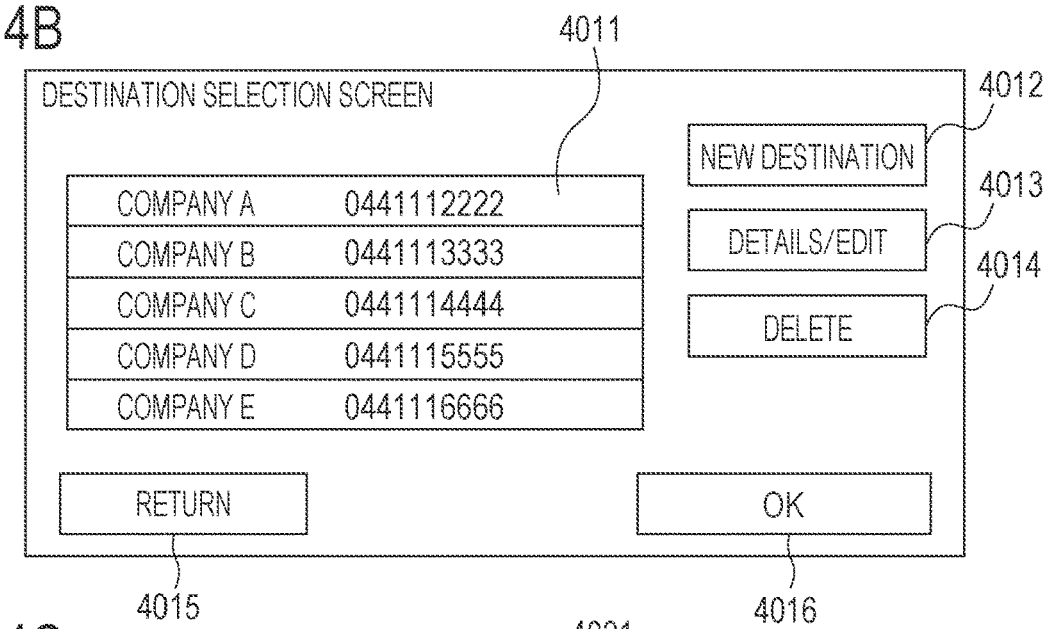
FIG. 4B illustrates a destination selection screen displayed when an address book button is selected in the screen illustrated in FIG. 4A.
Figure 4C:
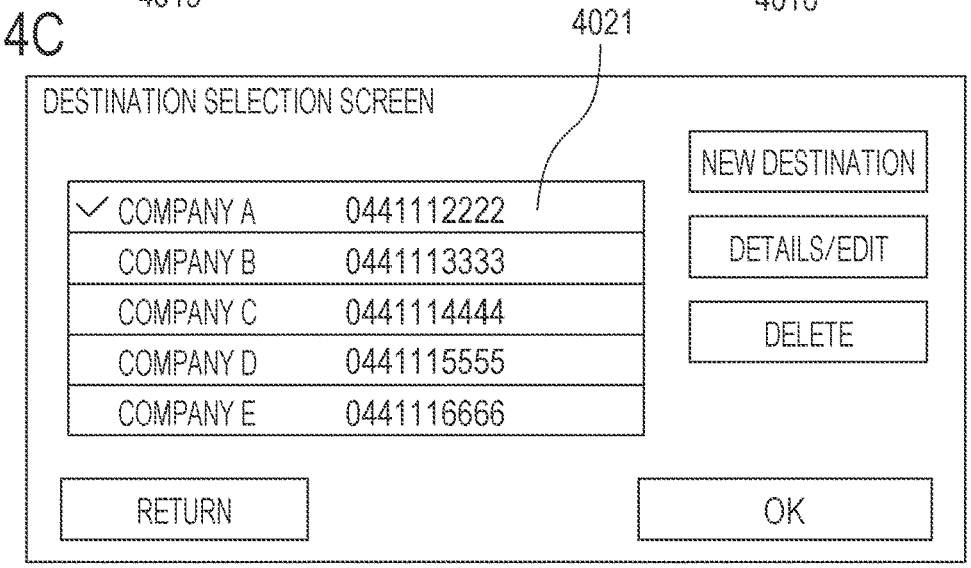
FIG. 4C illustrates a screen displayed when the user selects one of destinations in the screen illustrated in FIG. 4B.

FIGS. 4A to 4C illustrate send screens displayed on the touch panel of the image processing apparatus according to the present disclosure. The send screens are an example of screens displayed in the destination selection process when screen transitions occur in accordance with the flowcharts in FIGS. 9 to 11 (described below).

FIG. 4A illustrates a send screen that is displayed when the send button 2004 is touched on the touch panel 2001 of the operation unit.

The send screen illustrated in FIG. 4A has, displayed therein, an address book button 4001 used to select a destination, a one-touch button 4002, and a new entry button 4003 used to input a new destination. In addition, the send screen illustrated in FIG. 4A has, displayed therein, a resolution button 4004, a paper size button 4005, and a density button 4006, which are used to configure the scan settings when a document to be sent is scanned.

FIG. 4B illustrates the destination selection screen displayed in response to selection of the address book button 4001 in the screen illustrated in FIG. 4A.

A destination selection area 4011 has, displayed therein, a list of destinations in an address book stored in the HDD 1004 in advance. In the area other than the destination selection area 4011, a new destination button 4012, a details/edit button 4013, a delete button 4014, a return button 4015, and an OK button 4016 are displayed.

FIG. 4C illustrates the screen displayed when a user selects one of the destinations on the screen illustrated in FIG. 4B. In this screen, a check mark indicates that the destination "Company A 0441112222" is selected.

As described above, when a user selects a send destination, the user can select the destination by touching the address book button 4001 in the send screen and, thereafter, touching the destination listed in the destination selection screen of the touch panel 2001.

Figure 9:
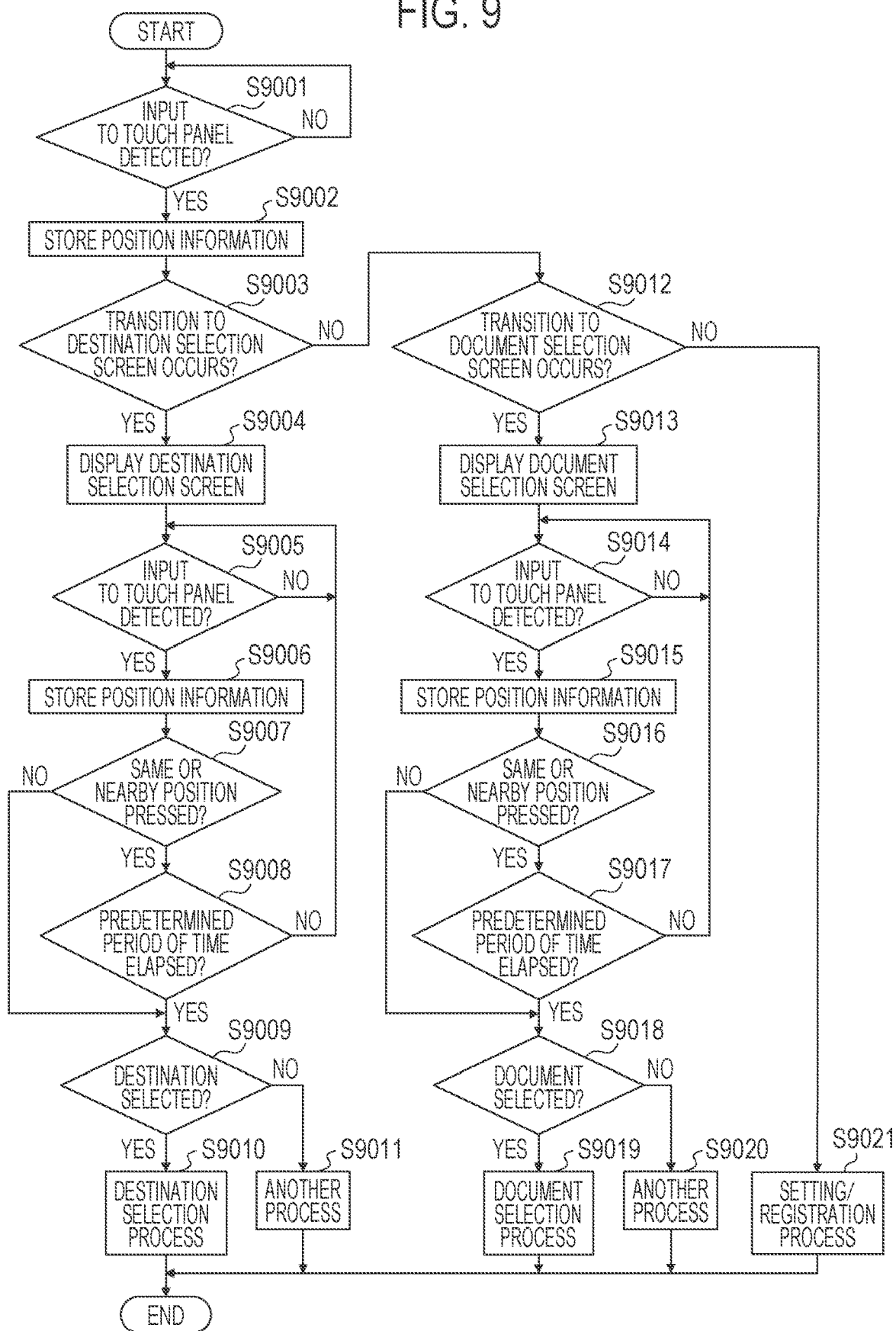
FIG. 9 is a flowchart of a destination selection process.

FIG. 9 is a second flowchart of a destination selection process which enables a user to select a destination while preventing incorrect selection of the destination in the destination selection screen. The process illustrated in the second flowchart is accomplished by the CPU 1001 loading a program stored in the ROM 1002 into the RAM 1003 and executing the loaded program.

When the user performs a touch operation on the touch panel 2001, the CPU 1001 obtains, from the operation unit 1007, the position information that indicates the touch position along with touch detection notification (step S9001).

Subsequently, the CPU 1001 stores the position information obtained in step S9001 (step S9002).

After obtaining the position information, the CPU 1001 identifies one of the buttons displayed on the touch panel 2001 and corresponding to the position information. Thereafter, the CPU 1001 determines whether the current screen transitions to the destination selection screen (step S9003).

Thereafter, if transition to the destination selection screen occurs, that is, if the address book button 4001 illustrated in FIG. 4A is touched, the processing proceeds to step S9004. However, if transition to the destination selection screen does not occur, the processing proceeds to step S9012.

Subsequently, the CPU 1001 displays the destination selection screen (the screen illustrated in FIG. 4B) on the touch panel 2001 (step S9004).

Subsequently, the CPU 1001 monitors a touch input from the user onto the touch panel (step S9005).

Thereafter, if a touch is detected, the processing proceeds to step S9006.

Subsequently, the CPU 1001 stores the position information obtained through the touch detection in step S9005 (step S9006).

Subsequently, the CPU 1001 determines whether the position information stored in step S9002 and the position information stored in step S9006 are the same or nearby coordinates (whether the distance between the position of first touch and the position of second touch is within a predetermined distance) (step S9007).

If it is determined that the two coordinates are the same or nearby coordinates, the processing proceeds to step S9008. However, if it is determined that the two coordinates are neither the same nor nearby coordinates, the processing proceeds to step S9009.

Subsequently, the CPU 1001 determines whether a predetermined period of time has elapsed from the time the destination selection screen (the screen illustrated in FIG. 4B) was displayed in step S9004 (step S9008).

If it is determined that the predetermined period of time has elapsed, the processing proceeds to step S9009. However, if it is determined that the predetermined period of time has not elapsed, the CPU 1001 invalidates touch detection, and the processing returns to step S9005.

Subsequently, if the CPU 1001 detects that a destination is selected using the position information in touch detection, the processing proceeds to step S9010. However, if the CPU 1001 detects that a button other than a destination is selected, the processing proceeds to step S9011 (step S9009).

That is, if a destination is selected in the destination display area 4011 of the destination selection screen (the screen illustrated in FIG. 4B), the processing proceeds to step S9010. However, if a button other than the destination display area 4011 is selected, the processing proceeds to step S9011.

Subsequently, the CPU 1001 displays a check mark indicating that the destination has been selected in the destination selection process (step S9010).

In addition, if a button other than the destination is selected, the CPU 1001 makes screen transition in accordance with the selected button in the same way as in step S8019 (step S9011).

As described above, in screen transition to the destination selection screen, selection of a destination can be prohibited within a predetermined period of time by performing control such that touch detection at coordinates that are the same or nearby coordinates in the previous touch detection is ignored until a predetermined period of time elapses.

As a result, even when, for example, a user taps the address book button 3001 twice or more to select a destination, the selection of the destination is prohibited for a predetermined period of time after the transition to the destination selection screen. Thus, selection of an incorrect destination can be prevented.

Subsequently, prevention of incorrect document selection is described below with reference to a flowchart.

If, in step S9003, it is determined that the transition is not screen transition to the destination selection screen, the CPU 1001 determines whether the transition is screen transition to the document selection screen (step S9012).

If the transition is screen transition to the document selection screen, the processing proceeds to step S9013. However, if the transition is not screen transition to the document selection screen, the processing proceeds to step S9021, where the CPU 1001 causes the touch panel 2001 to make screen transition in accordance with the selected button in the same way as in step S8020.

Subsequently, the CPU 1001 causes the touch panel 2001 to display the document selection screen (the screen illustrated in FIG. 5B) (step S9013).

Subsequently, the CPU 1001 monitors a touch input from the user onto the touch panel (step S9014). If a touch is detected, the processing proceeds to step S9015.

Subsequently, the CPU 1001 further stores position information obtained through touch detection performed in step S9014 (step S9015).

Subsequently, the CPU 1001 determines whether the position information stored in step S9002 and the position information stored in step S9015 are coordinates that are the same or are close to each other (step S9016).

If it is determined that the two coordinates are the same or nearby coordinates, the processing proceeds to step S9017. However, if it is determined that the two coordinates are neither the same nor close to each other, the processing proceeds to step S9018.

Subsequently, the CPU 1001 determines whether a predetermined period of time has elapsed from the time the document selection screen was displayed in step S9013 (step S9017).

If it is determined that the predetermined period of time has elapsed, the processing proceeds to step S9018. However, if it is determined that the predetermined period of time has not elapsed, the CPU 1001 invalidates touch detection, and the processing returns to step S9014.

Subsequently, if the CPU 1001 detects that a document is selected using the position information in touch detection, the processing proceeds to step S9019. However, if the CPU 1001 detects that a button other than a document is selected, the processing proceeds to step S9020 (step S9018).

That is, if a document is selected in the document selection area 5011 of the document selection screen (the screen illustrated in FIG. 5B), the processing proceeds to step S9019. However, if a button other than the document selection area 5011 is selected, the processing proceeds to step S9020.

Subsequently, the CPU 1001 displays a check mark indicating that the document has been selected in a document selection process (step S9019).

In addition, if a button other than the document is selected, the CPU 1001 causes the touch panel 2001 to make a screen transition in accordance with the selected button (step S9020).

As described above, if the position touched to display the destination selection screen and the position touched after displaying the destination selection screen are the same or close to each other, the CPU 1001 determines that the user has touched the screen by mistake and does not select the destination by touch detection.

As a result, degradation of the user's operability can be prevented while avoiding an unwanted operation caused by incorrect selection. In particular, for example, it is possible to prevent the user from accidentally touching the same or nearby position twice and, thus, selecting an unintended destination.

Third Embodiment

According to the first embodiment, the example of a technique for preventing incorrect selection of a destination has been described, in which destinations are not displayed until a predetermined period of time elapses, and the destinations are displayed after the predetermined period of time has elapsed.

According to a third embodiment, if two touch operations are detected in a short period of time and a second touch position is inside the destination area, an example of not selecting a destination by a second touch operation is described.

Figure 10:
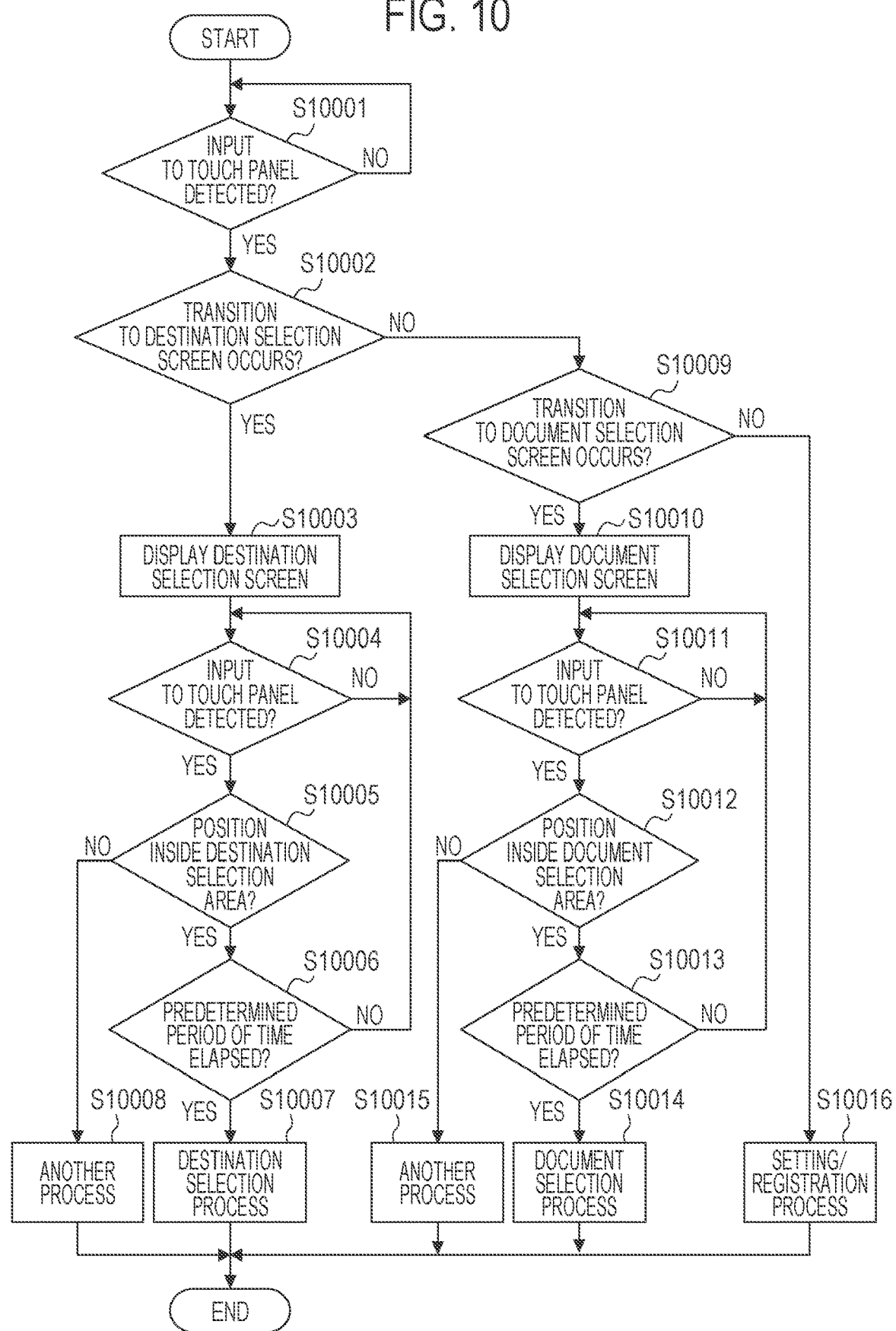
FIG. 10 is a flowchart of a destination selection process.

FIG. 10 is a third flowchart of a destination selection process which enables a user to select a destination while preventing incorrect selection of the destination in the destination selection screen. The process illustrated in the third flowchart is accomplished by the CPU 1001 loading a program stored in the ROM 1002 into the RAM 1003 and executing the loaded program.

When the user performs a touch operation on the touch panel 2001, the CPU 1001 obtains, from the operation unit 1007, the position information that indicates the touch position along with touch detection notification (step S10001).

Subsequently, the CPU 1001 identifies one of the buttons displayed on the touch panel 2001 and corresponding to the position information. Thereafter, the CPU 1001 determines whether the current screen transitions to the destination selection screen (step S10002).

Thereafter, if transition to the destination selection screen occurs, that is, if the address book button 4001 illustrated in FIG. 4A is touched, the processing proceeds to step S10003.

However, if transition to the destination selection screen does not occur, the processing proceeds to step S10009.

Subsequently, the CPU 1001 displays the destination selection screen (the screen illustrated in FIG. 4B) on the touch panel 2001 (step S10003).

Subsequently, the CPU 1001 monitors a touch input from the user onto the touch panel (step S10004).

Thereafter, if a touch is detected, the processing proceeds to step S10005.

Subsequently, the CPU 1001 determines whether the coordinate position obtained through the touch detection performed in step S10004 is coordinates inside the destination display area 4011 of the destination selection screen (the screen illustrated in FIG. 4B) (step S10005).

If it is determined that the coordinate position is inside the destination display area 4011, the processing proceeds to step S10006. However, if it is determined that the coordinate position is outside the destination display area 4011, the processing proceeds to step S10008.

Subsequently, the CPU 1001 determines whether a predetermined period of time has elapsed from the time the destination selection screen (the screen illustrated in FIG. 4B) was displayed in step S10003 (step S10006).

If it is determined that the predetermined period of time has elapsed, the processing proceeds to step S10007. However, if it is determined that the predetermined period of time has not elapsed, the CPU 1001 invalidates the touch detection, and the processing returns to step S10004.

Subsequently, if, in step S10006, it is determined that the predetermined period of time has elapsed, the CPU 1001 displays a check mark indicating that the destination has been selected in the destination selection process (step S10007).

In addition, if a button other than the destination is selected, the CPU 1001 makes screen transition in accordance with the selected button in the same way as in step S9011 (step S10008).

That is, if a destination in the destination display area 4011 is selected in the destination selection screen (the screen illustrated in FIG. 4B) before the predetermined period of time elapses, key detection is ignored, and the detection is performed again. However, if a destination in the destination display area 4011 is selected after the predetermined period of time has elapsed, a check mark is given to the selected destination, as illustrated in the destination selection screen (the screen illustrated in FIG. 4C). However, if a button other than the destination display area 4011 is selected, screen transition is made in accordance with the selected button, regardless of the elapsed time.

As described above, in screen transition to the destination selection screen, selection of a destination can be prohibited within a predetermined period of time by performing control such that touch detection in the destination display area 4011 is ignored if the predetermined period of time has not elapsed.

As a result, even when, for example, a user taps the address book button 3001 twice or more to select a destination, the selection of the destination is prohibited for a predetermined period of time after the transition to the destination selection screen. Thus, selection of an incorrect destination can be prevented.

Subsequently, prevention of incorrect document selection is described below with reference to a flowchart.

If, in step S10002, it is determined that the transition is not screen transition to the destination selection screen, the CPU 1001 determines whether the transition is screen transition to the document selection screen (step S10009).

If the transition is screen transition to the document selection screen, the processing proceeds to step S10010. However, if the transition is not screen transition to the document selection screen, the processing proceeds to step S10016, where the CPU 1001 makes screen transition in accordance with the selected button in the same way as in step S8020.

Subsequently, the CPU 1001 causes the touch panel 2001 to display the document selection screen (the screen illustrated in FIG. 5B) (step S10010).

Subsequently, the CPU 1001 monitors a touch input from the user onto the touch panel (step S10011).

If a touch is detected, the processing proceeds to step S10012.

Subsequently, the CPU 1001 determines whether the position information obtained through touch detection in step S10011 is coordinates in the document selection area 5011 of the document selection screen (the screen illustrated in FIG. 5B) (step S10012).

If it is determined that the position information is coordinates in the document selection area 5011, the processing proceeds to step S10013. However, if the position information is coordinates outside the document selection area 5011, the processing proceeds to step S10015.

Subsequently, the CPU 1001 determines whether a predetermined period of time has elapsed from the time the document selection screen (the screen illustrated in FIG. 5B) was displayed at step S10010 (step S10013).

If it is determined that the predetermined period of time has elapsed, the processing proceeds to step S10014. However, if it is determined that the predetermined period of time has not elapsed, the CPU 1001 invalidates touch detection, and the processing returns to step S10011.

Subsequently, if, in step S10013, the CPU 1001 determines that the predetermined period of time has elapsed, the CPU 1001 controls the touch panel 2001 to display a check mark indicating that the document has been selected in a document selection process (step S10014).

However, if a button other than a document is selected, the CPU 1001 makes screen transition in accordance with the selected button in the same way as in step S10008 (step S10015).

As described above, according to the present embodiment, if two touch operations are detected in a short period of time and if a second touch is inside the destination area, selection of the destination by the second touch operation is not made.

As a result, degradation of the user's operability can be prevented while avoiding an unwanted operation caused by incorrect selection. In particular, for example, it is possible to prevent the user from selecting an unintended destination by accidentally touching the destination area in a short period of time. In contrast, if the area touched for the second time is an area other than the destination area (for example, the new destination button), pressing of the new destination button is validated, and the image forming apparatus can display the new destination registration screen.

Fourth Embodiment

According to the second embodiment, the example of a technique for preventing incorrect selection of a destination has been described, in which the control is changed depending on whether the position of a touch to display the destination selection screen is the same as (or close to) the position of a touch after the destination selection screen is displayed.

In addition, according to the third embodiment, the example has been described in which if two touch operations are detected in a short period of time and if the position of a second touch is not inside the destination area, selection of a destination triggered by the second touch is not made.

According to the fourth embodiment, if two touch operations are detected in a short period of time, it is determined whether the position of the first touch operation and the position of the second touch operation is the same or close to each other. If the position of the first touch operation and the position of the second touch operation is the same or close to each other, a warning screen is displayed without detection relating to a touch operation.

Figure 6A:
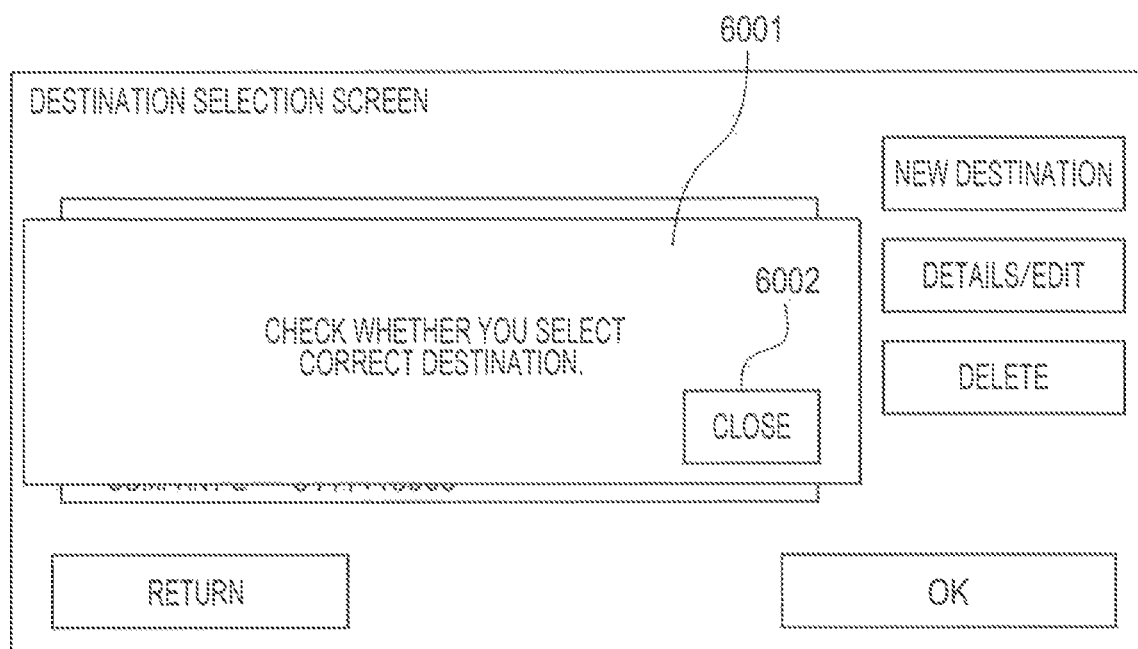
FIG. 6A illustrates a warning screen displayed over the destination selection screen.
Figure 6B:
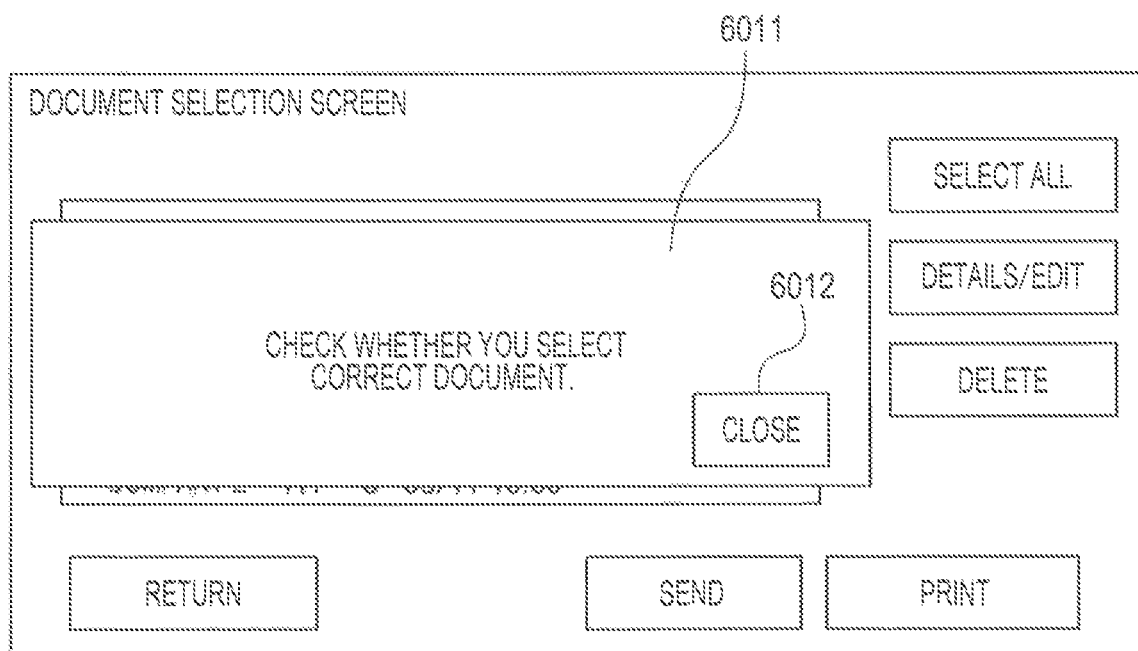
FIG. 6B illustrates a warning screen displayed over the document selection screen.

FIGS. 6A and 6B are diagrams illustrating the warning screen displayed on the image forming apparatus according to the present disclosure.

FIGS. 6A and 6B illustrate examples of the warning screen displayed when a destination and a document is selected, respectively, in the case of screen transition that occurs in accordance with a flowchart illustrated in FIG. 11 (described below).

The screen in FIG. 6A is the warning screen displayed over the destination selection screen.

If incorrect selection of a destination is detected in the destination selection screen, a warning pop-up screen that alerts incorrect selection of a destination is displayed, as indicated by a warning screen 6001.

The warning screen 6001 is closed when the user touches a close button 6002. At this time, the screen returns to the destination selection screen.

FIG. 6B illustrates a warning screen 6011 displayed over the document selection screen.

If incorrect selection of a document is detected in the document selection screen, a warning pop-up screen that alerts incorrect selection of a document is displayed, as indicated by a warning screen 6011.

The warning screen 6011 is closed when the user touches a close button 6012. At this time, the screen returns to the document selection screen.

Figure 11:
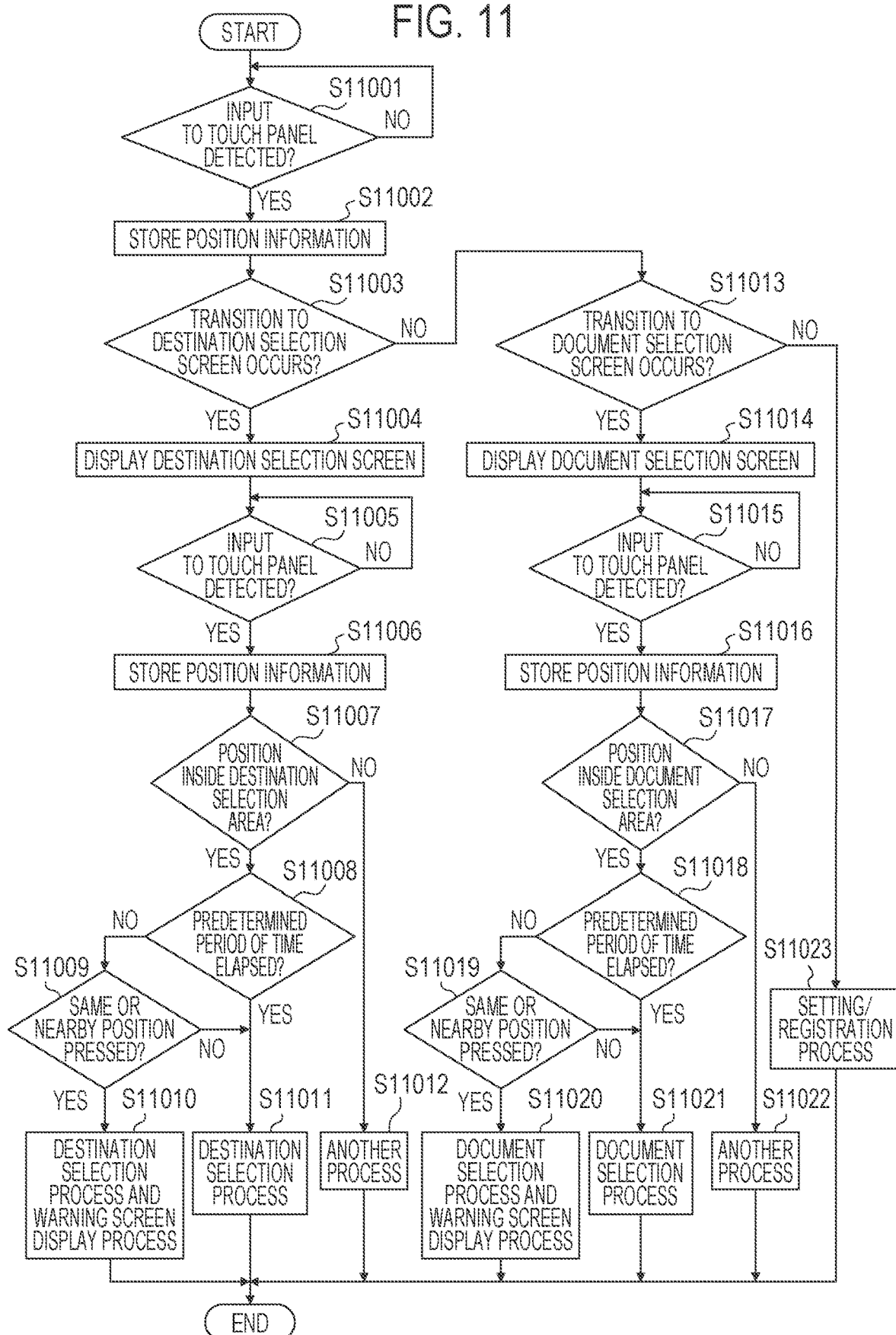
FIG. 11 is a flowchart of a destination selection process.

FIG. 11 is a fourth flowchart of a destination selection process that enables a user to select a destination while preventing incorrect selection of the destination in the destination selection screen. The process illustrated in the fourth flowchart is accomplished by the CPU 1001 loading a program stored in the ROM 1002 into the RAM 1003 and executing the loaded program.

When a user performs a touch operation on the touch panel 2001, the CPU 1001 obtains, from the operation unit 1007, the position information that indicates the touch position along with the touch detection notification (step S11001).

Subsequently, the CPU 1001 stores the position information obtained in step S11001 (step S11002).

After obtaining the position information, the CPU 1001 identifies one of the buttons displayed on the touch panel 2001 and corresponding to the position information. Thereafter, the CPU 1001 determines whether the current screen transitions to the destination selection screen (step S11003).

Thereafter, if transition to the destination selection screen occurs, that is, if the address book button 4001 illustrated in FIG. 4A is touched, the processing proceeds to step S11004. However, if transition to the destination selection screen does not occur, the processing proceeds to step S11013.

Subsequently, the CPU 1001 displays the destination selection screen (the screen illustrated in FIG. 4B) on the touch panel 2001 (step S11004).

Subsequently, the CPU 1001 monitors a touch input from the user onto the touch panel (step S11005).

Thereafter, if a touch is detected, the processing proceeds to step S11006.

Subsequently, the CPU 1001 stores the position information obtained through the touch detection in step S11005 (step S11006).

Subsequently, the CPU 1001 determines whether the coordinate position stored in step S11006 is coordinates inside the destination display area 4011 of the destination selection screen (the screen illustrated in FIG. 4B) (step S11007).

If it is determined that the coordinate position is inside the destination display area 4011, the processing proceeds to step S11008. However, if it is determined that the coordinate position is outside the destination display area 4011, the processing proceeds to step S11012.

Subsequently, the CPU 1001 determines whether a predetermined period of time has elapsed from the time the destination selection screen (the screen illustrated in FIG. 4B) was displayed in step S11004 (step S11008).

If it is determined that the predetermined period of time has not elapsed, the processing proceeds to step S11009. However, if it is determined that the predetermined period of time has elapsed, the processing proceeds to step S11011.

Subsequently, the CPU 1001 determines whether the position information stored in step S11002 and the position information stored in step S11006 are the same or nearby coordinates (step S11009).

If it is determined that the two coordinates are the same or nearby coordinates, the processing proceeds to step S11010. However, if it is determined that the two coordinates are neither the same nor nearby coordinates, the processing proceeds to step S11011.

Subsequently, if, in step S11008, the CPU 1001 determines that the predetermined period of time has not elapsed and if, in step S11009, the CPU 1001 determines that the same or nearby coordinates have been pressed, the destination selection screen is displayed along with the warning screen (step S11010).

However, if, in step S11008, the CPU 1001 determines that the predetermined period of time has elapsed or if, in step S11009, the CPU 1001 determines that the same or nearby coordinates have been pressed, the CPU 1001 displays the destination selection screen (step S11011).

In addition, if, in step S11007, the CPU 1001 determines that the position of an input to the touch panel is outside the destination display area 4011, the CPU 1001 makes screen transition in accordance with the selected button in the same way as in step S9011 (step S11012).

That is, if a destination is selected in the destination display area 4011 of the destination selection screen (the screen illustrated in FIG. 4B) before the predetermined period of time elapses and if the same or nearby coordinates are selected, a warning pop-up screen is displayed over the destination selection screen, as over the destination selection screen (the screen illustrated in FIG. 6A).

After viewing the warning screen, the user closes the pop-up screen by pressing the close button 6002 in the pop-up screen (the screen illustrated in FIG. 6A). Thus, the user can confirm the destination selected in the destination selection screen (the screen illustrated in FIG. 4C).

In contrast, if a destination is selected in the destination display area 4011 of the destination selection screen (the screen illustrated in FIG. 4B) after the predetermined period of time has elapsed or if coordinates other than the same or nearby coordinates are selected, the screen having, displayed therein, a destination with a check mark (e.g., the destination selection screen illustrated in FIG. 4C) is displayed.

However, if a button other than the destination display area 4011 is selected, screen transition is made in accordance with the selected button, regardless of the elapsed time.

As described above, a warning screen can be displayed if the same or nearby coordinates are selected before a predetermined period of time elapses since screen transition to the destination selection screen.

As a result, when, for example, a user taps the address book button 3001 twice or more to select a destination, selection of an incorrect destination can be prevented by displaying a warning screen.

Subsequently, prevention of incorrect document selection is described below with reference to a flowchart.

If, in step S11003, the transition is not transition to the destination selection screen, the CPU 1001 determines whether the transition is transition to the document selection screen (step S11013).

If the transition is transition to the document selection screen, the processing proceeds to step S11014. However, if the transition is not transition to the document selection screen, the processing proceeds to step S11023, where the CPU 1001 makes screen transition to a screen in accordance with the selected button in the same way as in step S8020.

Subsequently, the CPU 1001 displays the document selection screen (the screen illustrated in FIG. 5B) on the touch panel 2001 (step S11014).

Subsequently, the CPU 1001 monitors a touch input from the user onto the touch panel (step S11015).

If a touch is detected, the processing proceeds to step S11016.

Subsequently, the CPU 1001 further stores the position information obtained through the touch detection made in step S11015 (step S11016).

Subsequently, the CPU 1001 determines whether the coordinate position stored in step S11016 is inside the document selection area 5011 of the document selection screen (the screen illustrated in FIG. 5B) (step S11017).

If it is determined that the coordinate position is inside the document selection area 5011, the processing proceeds to step S11018. However, if the coordinate position is outside the document selection area 5011, the processing proceeds to step S11022.

Subsequently, the CPU 1001 determines whether the predetermined period of time has elapsed from the time the document selection screen (the screen illustrated in FIG. 5B) was displayed in step S11014 (step S11018).

If it is determined that the predetermined period of time has not elapsed, the processing proceeds to step S11019. However, if it is determined that the predetermined period of time has elapsed, the processing proceeds to step S11021.

Subsequently, the CPU 1001 determines whether the position information stored in step S11002 and the position information stored in step S11016 are the same or nearby coordinates (step S11019).

If it is determined that the two position information values are the same or nearby coordinates, the processing proceeds to step S11020. However, if it is determined that the two position information values are neither the same nor nearby coordinates, the processing proceeds to step S11021.

Subsequently, if, in step S11018, the CPU 1001 determines that the predetermined period of time has not elapsed and if, in step S11019, the CPU 1001 determines that the same or nearby coordinates are pressed, the CPU 1001 displays the document selection screen along with the warning pop-up screen (step S11020).

After viewing the warning screen, the user presses the close button 6012 in the pop-up screen (the screen illustrated in FIG. 6B) to close the pop-up window. Thus, the user can confirm the document selected in the document selection screen (the screen illustrated in FIG. 5C).

In addition, if, in step S11018, the CPU 1001 determines that the predetermined period of time has elapsed or if, in step S11019, the CPU 1001 determines that a position other than the same or nearby coordinates are pressed, the CPU 1001 displays the destination selection screen (step S11021).

In addition, if, in step S11017, it is determined that the touch input onto the touch panel is performed outside of the destination display area 4011, the CPU 1001 makes screen transition in accordance with the selected button in the same way as in step S9011 (step S11022).

As described above, if the position of the first touch operation and the position of the second touch operation are the same or close to each other, a warning screen is displayed without detection relating to a touch operation. In this manner, the user can easily get to know that they may have accidentally selected an unintended destination by making two touches in a short period of time.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image data sending apparatus for sending image data to a destination selected using a touch panel, the image data sending apparatus comprising:

the touch panel; and a detection unit configured to detect a touch on the touch panel, wherein in a case where a first touch is detected by the detection unit on a first screen, the first screen is changed to a second screen, and, subsequently, a second touch is detected on the second screen within a predetermined period after the first screen was changed to the second screen and if an object displayed at a position at which the second touch is detected is an object used to select a destination of the image data, selection of the destination by the second touch on the object is not performed, and in a case where the first touch is detected by the detection unit on the first screen, the first screen is changed to the second screen, and, subsequently, the second touch is detected on the second screen within the predetermined period after the first screen was changed to the second screen and if the object displayed at the position at which the second touch is detected is an object used to register a new destination of the image data, a third screen for registering the new destination of the image data is displayed on the touch panel.

2. The image data sending apparatus according to claim 1, wherein the third screen includes an OK button, wherein the display of the third screen is changed if the OK button is selected.

3. The image data sending apparatus according to claim 1, wherein the destination is a mail address used for sending the image data.

4. The image data sending apparatus according to claim 1, wherein the destination is a facsimile number used for sending the image data.

5. The image data sending apparatus according to claim 1, wherein in a case where the first touch is detected by the detection unit on the first screen, the first screen is changed to the second screen, and, subsequently, the second touch is detected on the second screen after the predetermined period and if the object displayed at the position at which the second touch is detected is the object used to select the destination of the image data, selection of the destination by the touch on the object is performed.

6. The image data sending apparatus according to claim 1, wherein the predetermined period is able to be changed by a user.

7. The communication device according to claim 1, further comprising a determining unit is configured to determine whether the predetermined period is passed after the first screen was changed to the second screen, wherein, in a case where the first touch is detected by the detection unit on the first screen, the first screen is changed to the second screen, and, subsequently, the second touch is detected on the second screen, the determining unit determines whether the predetermined period is passed after the first screen was changed to the second screen, and wherein, if the determining unit determines that the predetermined period is not passed after the first screen was changed to the second screen and the object displayed at the position at which the second touch is detected is the object used to select the destination of the image data, selection of the destination by the touch on the object is not performed.

8. The communication device according to claim 7, wherein if the determining unit determines that the predetermined period is passed after the first screen was changed to the second screen and the object displayed at the position at which the second touch is detected is the object used to select the destination of the image data, selection of the destination by the touch on the object is performed.

9. A method for controlling an image data sending apparatus for sending image data to a destination selected using a touch panel, the method comprising:

detecting by a detection unit a touch on the touch panel, wherein in a case where a first touch is detected by the detection unit on a first screen, the first screen is changed to a second screen, and, subsequently, a second touch is detected on the second screen within a predetermined period after the first screen was changed to the second screen and if an object displayed at a position at which the second touch is detected is an object used to select a destination of the image data, selection of the destination by the second touch on the object is not performed; and in a case where the first touch is detected by the detection unit on the first screen, the first screen is changed to the second screen, and, subsequently, the second touch is detected on the second screen within the predetermined period after the first screen was changed to the second screen and if the object displayed at the position at which the second touch is detected is an object used to register a new destination of the image data, displaying, on the touch panel, a third screen for registering the new destination of the image data.

10. A non-transitory computer readable storage medium for storing a computer program for causing an image data sending apparatus to execute a method, the image data sending apparatus sending image data to a destination selected using a touch panel, the method comprising:

detecting by a detection unit a touch on the touch panel, wherein in a case where a first touch is detected by the detection unit on a first screen, the first screen is changed to a second screen, and, subsequently, a second touch is detected on the second screen within a predetermined period of the first screen was changed to the second screen and if an object displayed at a position at which the second touch is detected is an object used to select a destination of the image data, selection of the destination by the second touch on the object is not performed; and in a case where the first touch is detected by the detection unit on the first screen, the first screen is changed to the second screen, and, subsequently, the second touch is detected on the second screen within the predetermined period after the first screen was changed to the second screen and if the object displayed at the position at which the second touch is detected is an object used to register a new destination of the image data, displaying, on the touch panel, a third screen for registering the new destination of the image data.

* * * * *